United States Patent [19]
von Nordenskjold

[11] Patent Number: 5,089,179
[45] Date of Patent: Feb. 18, 1992

[54] FLOATING AERATOR ARRANGEMENT

[76] Inventor: Reinhart von Nordenskjold, Killistrasse 3, W-8011 Egmating-Münster, Fed. Rep. of Germany

[21] Appl. No.: 639,028

[22] Filed: Jan. 9, 1991

[30] Foreign Application Priority Data

Jan. 17, 1990 [DE] Fed. Rep. of Germany ....... 4001201

[51] Int. Cl.$^5$ ................................................ B01F 3/04
[52] U.S. Cl. ........................................ 261/81; 261/120; 210/242.2
[58] Field of Search ............... 261/81, 120; 210/242.2

[56] References Cited
U.S. PATENT DOCUMENTS

| | | | |
|---|---|---|---|
| 3,033,372 | 5/1962 | Riddick | 261/120 |
| 3,758,083 | 9/1973 | Palmer | 261/120 |
| 4,215,082 | 7/1980 | Danel | 261/120 |
| 4,287,060 | 9/1981 | Coggins | 210/242.2 |
| 4,287,062 | 9/1981 | von Nordenskjold | 210/199 |
| 4,308,137 | 12/1981 | Freeman | 210/242.2 |
| 4,514,343 | 4/1985 | Cramer et al. | 210/242.2 |
| 4,797,211 | 1/1989 | von Nordenskjold | 210/164 |

*Primary Examiner*—Tim Miles
*Attorney, Agent, or Firm*—Brumbaugh, Graves, Donohue & Raymond

[57] ABSTRACT

In the embodiments described in the specification, a floating aerator for the introduction of air into a body of water such as an activated sludge plant having at least one air supply line extending along the surface of the water with aerators suspended below the surface of the water, has floats mounted on the air supply line and branch air lines extending from the air supply line through each float to a suspended aerator. Each air supply line is a continuous line extending through the floats and the floats are made of two preformed interlocking, buoyant sections.

14 Claims, 2 Drawing Sheets

FLOATING AERATOR ARRANGEMENT

BACKGROUND OF THE INVENTION

This invention relates to arrangements for introducing air into a body of wastewater, such as an activated sludge basin, in which an aerator is suspended below the surface of the water by a float associated with an air supply line.

Such floating aerator arrangements are described, for example, in the U.S. Pats. to von Nordenskjold Nos. 4,287,062 and 4,797,212. As described in those patents, the introduction of air into a basin containing wastewater by floating aerators of this type, particularly for the clarification and biological purification of the wastewater in socalled activated sludge systems, produces a very effective cleaning of the basin with a very low energy expenditure. The floating aerator arrangements described in those patents include lines of aerators that are spaced from each other, extending across the part of the basin to be aerated, so that the lines, which are at the surface of the water, move laterally in a reciprocating manner. Tubes extending downwardly from the aerator lines supply air from them to the aerators suspended below the surface of the water.

When the term "air" or "aeration" is used herein, that term includes, in general, gases such as oxygen and also gas mixtures and the introduction of them into the water for special applications. When the term "water" is used herein, that term includes all types of liquids which may be processed by air or aeration.

As a result of the reciprocating movement of the air supply lines, the suspended aerators also move back and forth below the water surface and thus move through the entire volume of water in the aerated portion of the basin, which results in a very uniform introduction of oxygen into the water. The travelling movement of these air lines with suspended aerators, which are also referred to as "aerator chains", results from the introduction of air through the suspended aerators, so that no external driving force is required. For further details regarding this action, reference can be made to the above-mentioned United States patents which are incorporated herein by reference.

In those prior art aeration systems, the air supply lines in the aerator chains consist of hose sections, and the aerators are suspended from T-shaped tube members having horizontal arms to which the hose sections are connected and a vertical leg leading to the suspended aerator, along with floats attached to the T-shaped tube members or to the adjacent ends of the hose sections. The hose sections, which extend between adjacent T-shaped tube members, are attached to the arms of those members by hose clamps or the like in a conventional manner.

Although this arrangement has proved effective to produce a reciprocating movement of the floating aerators with the resulting biological cleaning action, it has been found that the float arrangement could be improved. In many instances, the aeration chains containing the floating aerators must be quite long, for example, 30–50 meters, in order to extend from one side of a basin to the other side. As a result, not only during assembly but also in operation, considerable forces are applied to the joints between the flexible hose sections of the air supply line and the T-shaped tube members where the floats are provided. This may cause damage to those joints so that the air lines become leaky and ultimately fail at these points, for example, by being completely torn apart. As a result, the operation of the entire floating aerator chain is terminated, which endangers the operation and biology of the whole aeration system in the basin and frequently leads to a complete breakdown in an irreparable manner, requiring the activated sludge to be built up again in a lengthy process. Moreover, the repair of damaged joints is laborious, because it is necessary either to drain the water from the basin or to use rubber dinghies or the like in order to reach the joint locations and carry out the necessary repairs. A very particularly disadvantageous result is caused by sludge entering the air lines following separation, which can lead to blockages of the lines.

A further disadvantage is that, during any such on-site repair, there is danger of injury to the person carrying out the repair. In particular, during tightening of the hose clamps at the connecting points, minor injuries may occur as a result of slippage of a screwdriver or from the edges of the projecting straps of the hose clamps, which is particularly dangerous because systems of this type contain large concentrations of harmful bacteria, which can lead to blood poisoning or the like in the worker.

Furthermore, in some cases, the floats are formed as a foam body which is injection-molded around a tubular T-shaped section which must be completely lined with tar or the like, resulting in a very expensive manufacturing process.

SUMMARY OF THE INVENTION

Accordingly, it is an object of the present invention to provide a new and improved floating aerator arrangement which overcomes the above-mentioned disadvantages of the prior art.

Another object of the invention is to provide an improved floating aerator arrangement having reduced manufacturing cost, easier maintenance and repairs, and greater operating reliability than prior floating aerator systems.

These and other objects of the invention are attained by providing an air line having a continuous hose section and two buoyant float sections mounted on opposite sides of the continuous hose section and connected to each other so as to substantially surround the hose section which is positioned in a through opening formed by the buoyant float sections.

By providing an air supply line which is in the form of a continuous hose line through a float in which a tube leading to an aerator is connected, enormous manufacturing advantages are attained because it is no longer necessary to trim hose sections to a suitable length in accordance with a particular basin aeration configuration. It is merely necessary to make available a specific hose length required for the basin. The floats and any associated aerators can then be affixed to the air line at any desired points. This also results in considerable advantages with respect to stability, because rupture or leakage of a continuous hose line does not occur as a practical matter. Thus, the joints between hose sections and tube parts are completely eliminated. This also eliminates related installation problems and the danger of injury to installers.

Also, with floats designed as preformed buoyant sections which, for example, are mounted laterally on the air supply line and joined together, an extremely simple installation of the floats at any desired points along the air line is made possible and installation of the floats can be carried out on site in a convenient manner. For installation, it is merely necessary to position the two preformed buoyant sections laterally against the hose line and then interlock them, for example, by bolting or clamping them together or the like. The air line extends through an opening formed in the preformed parts and the dimensions of the opening can be adjusted to the size of the air line so that a friction-locked connection between the air line and the floats is provided. The two preformed buoyant sections can be manufactured separately from each other.

However, it is also possible, within the scope of the invention, to design two preformed buoyant sections so that they are joined by a hinge along one edge, so that the float is mounted on the air line by swinging the two sections apart. Finally, it is also possible to join the preformed sections with each other initially so that a complete float body having an internal passage is provided, and the air line is threaded through the passage for assembly. The through passage need not necessarily be completely enclosed. For example, it is also possible, within the scope of the invention, to provide a through opening formed by an approximately semicircular or three-quarter-circular recess starting from the top of the float through which the air line can be threaded.

In each case, the time-consuming, expensive and always critical hose clamp assembly point for attachment of the T-shaped tube members and the floats to the air line is avoided. The floats can thus be produced in the form of preformed parts in an extremely simple manner, for example, by casting, blow-molding or foaming a plastic material into a mold, in which case the molded parts are hermetically sealed and, with appropriate design, serve as buoyant bodies. This means a reduction in the manufacturing costs and permits the external shape of the float to be optimized almost at random.

In one advantageous embodiment of the invention, two buoyant plastic half-sections which can be joined together are provided as preformed parts for each float. The particular plastic material to be considered is one having an adequate resistance to UV radiation, heat and water, i.e., one which is suitable, for example, for rough handling in clarification systems. In addition, by the use of two preformed buoyant parts, the advantage of a double security is obtained because, if one preformed part leaks, the other part can still provide the buoyant support function. Polyethylene is one example of a plastic material that can be considered for the formation of the floats.

In another advantageous embodiment of the invention, the preformed float sections are designed to interlock with each other. Such interlockability not only facilitates the installation of the preformed sections and, thus, the assembly of the floats on the air line, but also permits easy removal of the floats for replacement of any defective float and for relocation of the floats at any desired points.

A further simplification is obtained if the two preformed sections have a hinged joint along one edge, extending in the direction of the air supply line, which permanently connects the sections with each other. A hinged joint of this type has the advantage that it keeps the preformed sections in the appropriate relation to each other, so that the arrangement of the preformed sections on the air supply line and the appropriate assembly operations are further simplified. The hinged joint can, for example, be in the form of a plastic web connecting the two preformed sections with each other. In that case, the floats can be folded together around the air supply line in a simple manner, with the correlation of interlocking elements achieved automatically. As mentioned above, however, it is also possible to join the two preformed sections permanently together so that the mounting of the floats on the air line is carried out by threading the line through them.

In a further embodiment of the invention, the float has at least one opening to receive a branch air line for connecting an aerator supply tube to the air line. Such branch air lines, in the case of an air line made of a resilient material such as rubber, can be joined to the air line at spacings of any desired length and establish the connecting points between the supply tubes leading to the suspended aerators and the air supply line. If, as described above, the float is formed with openings for these branch connections, then it is possible to adapt the branch line-receiving opening to the diameter of the air branch connection in such a way that, at least in a vertical downward direction, a force-locked joint between the branch line and the float is established. This force-locked connection causes the pulling forces applied to the branch line as a result of the weight of the suspended aerator at the connecting point between the air supply line and the branch line to be transferred directly to the float, so that no pulling force reaches the above-mentioned connecting point and the branch air line, which can be mounted on the air line in the manner of a bicycle valve, cannot be pulled out. The branch line opening in the float may have an oval configuration, being elongated in the longitudinal direction of the air line, so that the branch line connection has some clearance in this direction in the float opening.

Although the connection between the branch air line and the tube leading to the suspended aerator can be provided by hose clamps, it is more advantageous to use rapid couplings, because, for one thing, the assembly is facilitated and, for another, there is no danger of injury to the installer.

In a further, very advantageous embodiment of the invention, the float has a wedge-shaped, blade-like projection extending downwardly in the water, and aligned in the direction of the air line. It has been found that a float design of this type provides very significant advantages in connection with the reciprocating motion of the floating aerators. Large-scale industrial tests have shown that, by providing such projections, the reciprocating motion of the aerator chain can be maintained with a significantly smaller air supply to the aerators than previously. Floats designed in this manner show a significantly better response to a specific energy input with respect to both the vertical water flow movement and the horizontal water flow. In the aerated parts of the basin, or throughout the whole basin into which the air is introduced, the vertical water velocity can be reduced significantly, for example, to 0.1–0.2 meters per second, without losing the lateral reciprocating movement of the chains. On the other hand, using a conventional float shape with a fine-bubble air introduction, a value of approximately 0.7 m/sec. of vertical water velocity was required to maintain reciprocating motion. Because of the reduced vertical water velocity requirement for the float of the invention, the residence time in the water of an air bubble emerging from a suspended aerator can be significantly longer. In this connection, the residence time of a bubble in the water is determined to a large extent not only by its intrinsic upward velocity of approximately 0.3 m/sec., but also by the vertical upward-flow movement of the water superimposed on this, which can be as low as 0.1–0.2 m/sec. in an aerated region using a float according to the invention. As a result, the bubbles remain in the water for a longer time, because they are not unnecessarily accelerated in a vertical direction by the requirement for a higher vertical water flow. The air bubble residence time has a linear relation, as a controlling parameter, in the mass transfer equation of the incorporation of oxygen into the water.

The blade-like shape of the floats also has the advantage that the floats have a higher energy absorption from the horizontal water flow, so that substantially less horizontal energy is left over to cause mixing or to transport water through the whole basin and the rate of flow of the water through a wastewater basin is thus distinctly reduced. This, in turn, has the advantage of providing an even more clearcut separation between individual aeration zones in a basin wherein such zones are subjected to different intensities of aeration in a conventional manner. In that case, special types of processes such as, for example, denitrification or the like are permitted to an even greater extent.

The blade-like float projection also has the advantage that a distinct reversal of the direction of motion of floating aerators or of the whole aerator chain takes place at the points of maximum amplitude in the lateral reciprocating motion. This occurs because, when the aerators suspended from the floats reach the point of maximum deflection of the chain, the floats are rotated about the air line in a circumferential direction, turning the blade-like projection correspondingly to provide a clear-cut position during the return movement. The blade-like projection also clearly divides the vertical flow and prevents the floats from being stopped. All of this causes the lateral reciprocating motion of the aeration chains to be carried out in an assured and reliable manner even in the event of a very low air supply so that every part of the basin can be uniformly supplied with air, if desired.

In particular, there is no rocking motion of the aeration chains which causes whole regions of the basin to be missed at some or all times resulting in, for example, sludge deposits. In the prior art aerator chains, rocking of the chains was observed in some cases, but this is no longer observed with the floats having blade-like projections according to the invention. Instead, the chains carry out a distinct reciprocating motion in the manner of the fundamental mode of a string vibration.

The uniform reciprocating motion of the chains also acts to prevent the development of a local vertical water flow, which could drive the bubbles rapidly in an upward direction in an unfavorable manner. The constant lateral motion of the suspended aerator producing the vertical water flow minimizes this effect.

If the float is also shaped such that the metacenter is located above the center of gravity with respect to the direction of immersion, this will result in a clear-cut positioning of the blade-shaped projection.

If the external shape of the float, starting from the blade-like projection, increases in horizontal width with increasing distance from the edge of the blade-like projection to a horizontally enlarged part with an oval cross-section having a horizontal major diameter, essentially floating on the water surface, this has the advantage that the float position, as a result of this special design, is particularly stable, for example, in comparison with a float of circular cross-section. Thus, the lower surface of the float body, which changes into the blade-like projection, rests essentially near the surface of the water and, even during minor swinging movements, the float is subjected to a considerable lift on the immersed side, because of the rapidly increasing displacement, which ultimately produces a particularly stabilizing action.

The ratio between the upper part of the float, i.e., the part that is visible above the water line, and the part of the float located below the water line preferably has a value of between about 1:2 and about 1:5. This means that the float is immersed to a relatively large extent into the water and, as a result, can readily absorb forces from the horizontal and vertical flows and can transform these into a lateral movement of the whole aerator chain. The horizontal width of the oval part of the float can correspond approximately to the total height of the float including the blade-like projection.

In order to mount the floats on the air supply line, in addition to locking elements or screwed connections, one or more hose clamps or the like, placed around the circumference of the float and passing through a recess in the blade-like projection of the float, can also be provided. Finally, the preformed parts of the float, which act as buoyant sections and are therefore sealed against the penetration of water, can be equipped with an air pressure compensation region that does not come into contact with the water, for example, in the manner of a slot on the top of the float, to permit escape of air from the preformed sections, for example, during operation in summer resulting in excessive heating, in order to prevent bursting of these sections.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
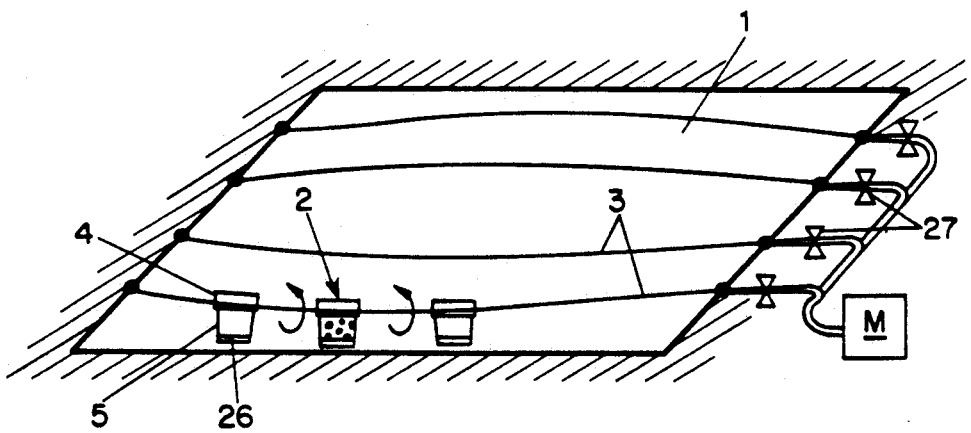
FIG. 1 is a schematic perspective view showing a typical wastewater treatment basin in which representative floating aerators arranged according to the invention are provided.

In the typical floating aerator arrangement shown in FIG. 1, a wastewater basin 1 receives wastewater to be biologically cleaned by the introduction of oxygen in a conventional manner which need not be shown in detail. To introduce oxygen, a series of floating aerator arrangements 2 extend across the tank in a conventional manner so that they can execute a reciprocating lateral movement having a certain displacement on the surface of the wastewater. This is shown in FIG. 1 by the oppositely-disposed positions of two pairs of air lines 3. In this application, the term "floating aerators" includes, for example, the air lines 3 extending from one side of the basin to the other, as well as floats 4 mounted at intervals on those air lines and pairs of downwardly extending connecting lines 5 leading to the ends of corresponding aerators 26 suspended from the air lines.

The suspended aerators 26 may be conventional ceramic cartridges or the like which are known in themselves and which, for example, are arranged so that they are held down by means of weights (not shown) from the air line. The air supplied through the air supply line 3 is conducted by way of the connecting lines 5 to the suspended aerators and is then injected by these to the water in the form of fine bubbles, with the air introduction taking place at a location close to the bottom of the basin, for example, at a distance of about 5 to about 30 cm. from the bottom. As a result of the introduction of air, a reciprocating lateral motion of the suspended aerators and the supply line is established in a wastewater basin of this type, which causes the aerators to sweep the essential part of the basin in a reciprocating movement in the vicinity of the bottom. This introduces air uniformly at desired points in the basin and locally circulates the water, without requiring a separate driving force to move the suspended aerators or the air line. As a result of the sweeping motion of the suspended aerators near the bottom of the basin, any deposited sludge is recirculated so that the sludge cannot die at the bottom of the basin.

As shown in FIG. 1, each air line 3 has a throttle valve 27 which makes it possible to adjust the air supply to each of the individual floating aerator lines separately so that regions of strong aeration, regions of weaker aeration, or regions without any aeration at all can be produced in the basin in a desired manner. This permits special wastewater treatment processes such as denitrification or the like.

It will be understood that the floats 4, the connecting lines 5, and the suspended aerators 26, which are shown on only one air line 3 in FIG. 1, are, of course, included on all of the air supply lines. For reasons of simplicity, only three such arrangements are shown in FIG. 1. If a basin of this type is operated as an activated sludge basin, then the basin will also have a quiescent zone located near the waste-located effluent and sludge collection gutters can also be located there, as described, for example, in U.S. Pat. No. 4,287,062.

In accordance with the invention, the air supply lines 3 are continuous hose lines and the floats 4 can be laterally mounted on these continuous lines 3. It is also possible, however, to thread the air line 3 through an opening provided in the floats 4. In the typical embodiment shown in FIGS. 2 and 3, the floats are assembled from preformed buoyant sections 6 and 7, which are shaped to provide a passage 9 for the air line 3 and which are connected to each other by locking elements that will be described in greater detail hereinafter with reference to FIG. 3. In addition, a strap 8, similar to a hose clamp or the like, can also be provided to hold the two preformed sections 6 and 7 together.

Figure 2:
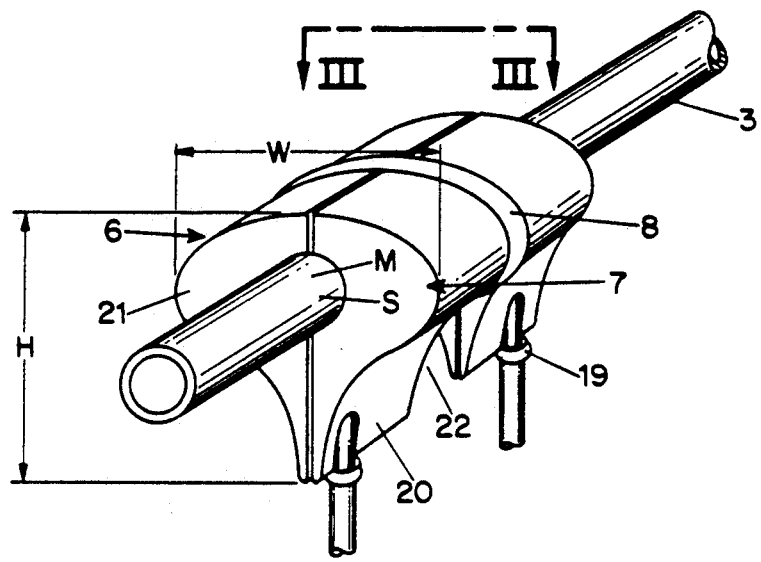
FIG. 2 is a perspective view illustrating a typical floating aerator arrangement with an assembled float attached to an air supply line in accordance with the invention.
Figure 3:
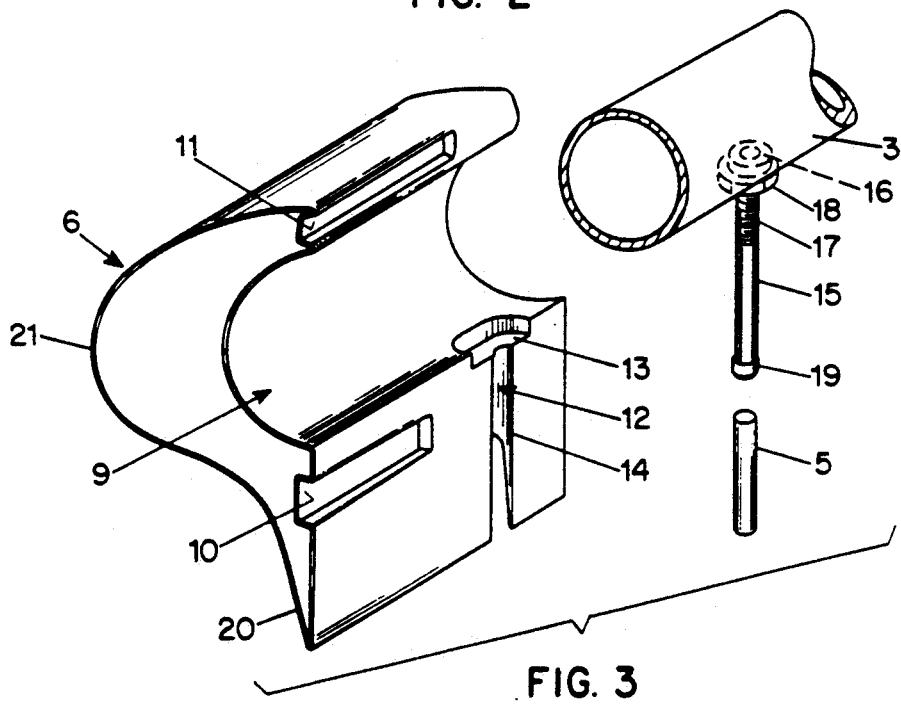
FIG. 3 is an exploded perspective sectional view taken along the line III—III of FIG. 2 showing one preformed section of a float and a part of an air line with an inserted branch line connection arranged according to the invention.

The construction of a preferred float consisting of two sections can be seen in FIG. 3, in which only one of two similar preformed sections is shown. The illustrated preformed section 6 is made of a plastic material such as polyethylene, and the second preformed section 7, not shown in FIG. 3, has a corresponding shape so that, when the sections are joined, the float shown in FIG. 2 is produced. In the section 6 shown in FIG. 3, there are two grooves 10 and 11 which receive correspondingly formed projections on the other preformed section 7. These grooves extend parallel to the passage 9 formed in the preformed section 6, and are located above and below that passage. The grooves 10 and 11 are formed so that, when the correspondingly formed projections in the other preformed section 7 are pressed into them, the two parts are interlocked with each other. In the illustrated embodiment, both grooves 10 and 11 are shorter than the preformed section and terminate short of the end of the preformed section at both ends but, if desired, the upper groove 11 may extend the entire length of the section 6.

Between the end of the groove 10 and the end of the preformed section 6, half of a receiving opening 12, extending perpendicular to the passage 9, is formed. The opening 12 includes an oval shoulder region 13 adjacent to the passage 9, enlarged in the direction of the air line 3, and a smaller-diameter section 14 with a semicircular cross-section, extending through a blade-like downward projection 20 of the float. It will be understood that a corresponding semicircular opening is provided at the same location in the other preformed section so that, after the two sections are joined, an opening that is oval is provided in the upper region and a circular opening 14 is provided in the blade-like projection.

In the assembled condition, a branch air line 15 passes through the opening 12. The branch air line 15 has a collar 16 at the end connected to the air line 3. The collar 16 is inserted through an appropriate opening cut in the wall of the air line where the connection is to be made so that the collar engages the inner surface of the air line around the opening. A nut 18, mounted on the branch air line 15 by a thread 17, is then screwed against the outside surface of the air line 3 and tightened firmly so as to clamp the wall of the air line between the opposed surfaces of the collar 16 and the nut 18. A connection in the manner of a bicycle valve is thus provided without, however, requiring any vulcanization.

It will be understood that the points along the air line 3 at which these branch air line connections are to be made need not be determined in advance. The assembly of these connections and, also, the positioning of the cutouts in the air line, can both be carried out on-site. The arrangement can also be easily changed after installation by closing any unnecessary air line openings with blind plugs. Reconstruction can then be carried out by locating branch air lines at any other desired points in the manner described above.

The branch air line can consist of an easily made, essentially rigid plastic tube, arranged to pass through the region 14 of the receiving opening 12, with the nut 18 positioned in the enlarged oval region 13 of this opening. As a result of the oval shape of the opening 13 which is enlarged in the direction of the air line 3, a certain play for the branch air line connection is permitted in this direction. However, the shoulder formed between the enlarged region 13 and the section 14 prevents any tensile load from being applied to the connecting point between the air line 3 and the branch air line 15 because any tensile force applied to the air line 15 in the vertical direction is transmitted by the nut 18 to the float and is absorbed by the float. Play can be left between the float and the line 15 in the other directions in order to prevent other forces on the float from being transmitted directly to the connection.

The length of the branch air line 15 is selected so that it projects downwardly below the float to a connection 19 where the connecting line 5 can be fastened to the branch air line 15 in a known manner by means of a conventional rapid coupling device. Each float preferably has two receiving openings 12 of this type for corresponding branch air lines and each suspended aerator is then connected at opposite ends to the branch lines from a corresponding float.

As illustrated in FIG. 2, the float consists of a lower wedge-shaped blade-like part 20 which will be designated hereinafter as a blade. The upper portion 21 of the float which rests on the surface of the water is joined to this blade 20. As seen from FIG. 2, the portion 21, after assembly of the two sections 6 and 7, has the cross-sectional form of an oval, with the ratio between the width W and the total height H of the float having a value of approximately 1:1 and where the part of the float located above the water in the case of a normal weight load can be in a ratio of about 1:2 to 1:5 to the part immersed in the water.

As a result of the provision of the blade on the float and the shape of the oval part floating on the water surface, a very stable float position is obtained. With an appropriate design, the metacenter M of the float is located above the center of gravity S, so that a stable float position is always provided automatically. The provision of the blade 20, which projects into the water from the oval part, assures that the water movements causing the float, and thus also the air line 3, to carry out a reciprocating movement can initiate the reciprocating movement at lower water flow rates. In other words, this means that a reliable reciprocating operation movement of the floating aerator chains can be maintained with a smaller air or oxygen flow rate and a smaller resulting vertical and horizontal water flow rate.

Furthermore, the effect of using the blade arrangement is that the floating aerators carry out a clear-cut reversal of motion at the points of their maximum deflection, so that there is no stoppage or rocking movement at those points which could cause parts of the tank to remain unaerated.

Figure 4D:
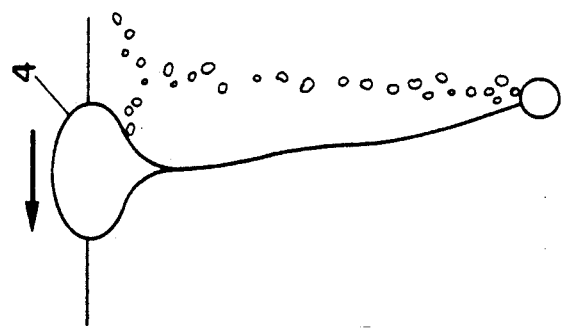
FIGS. 4a–4d are schematic views illustrating the operation of a representative floating aerator arrangement in accordance with the invention.
Figure 4C:
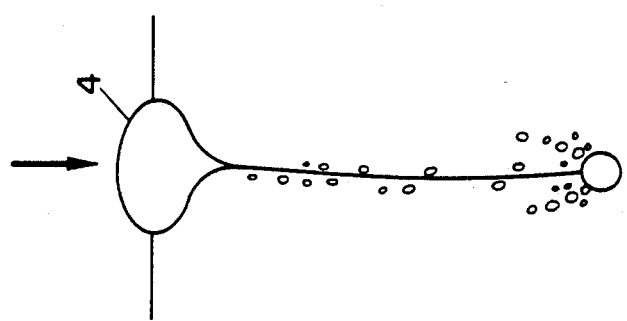
Figure 4B:
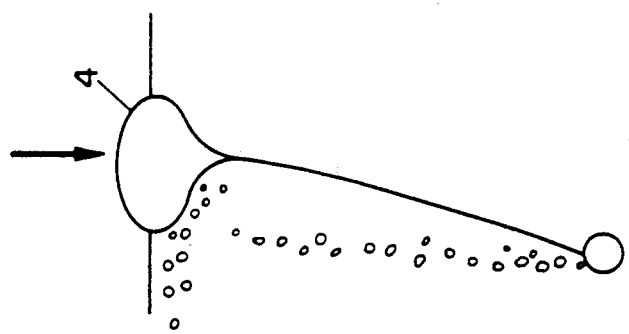
Figure 4A:
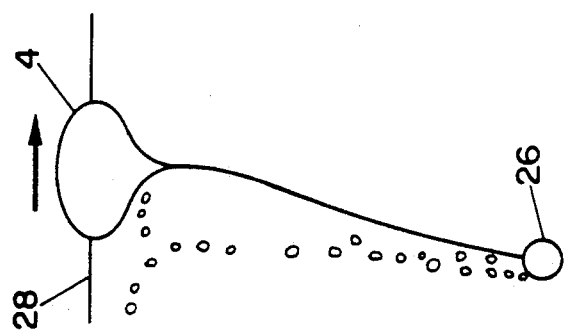

This aerator chain reversal process is shown by means of the time sequence illustrated in FIGS. 4a–4d. FIG. 4a shows the process by which the chain is driven in the direction of the arrow in that figure, when the reversal point has not yet been reached. In this lateral movement, the suspended aerators 26 lag behind the floats 4, which are located vertically above them in the rest position. Consequently, the upward water flow produced by the ascending air bubbles from the aerators is deflected against the blade causing movement of the floats and, thus, of the whole floating aerator chain in the indicated direction. When the chain has reached its maximum deflection in that direction, the float comes to a standstill. The air supply line is under such tension in this maximally extended position that restraining forces are generated in the line which are greater than the pressure exerted on the floats by the water flow.

The start of this standstill condition is shown in FIG. 4b. Because, in this phase, the float cannot travel any farther in a direction toward the right as shown in the drawing, the suspended aerator will pass underneath the blade, as shown in FIG. 4c. As a result, the water flow pressure on the blade in the direction of a further deflection, caused by the ascending bubbles shown in FIG. 4b, becomes lower, so that, finally, a condition develops in which the suspended aerator 26 comes to rest to the right of the float 4, as viewed in the drawing. Once this condition has been reached, the air bubbles, which continue to rise from the suspended aerator, along with the water flow produced thereby, rise on the right side of the blade which results in a return motion of the float and the aerator line as shown by the arrow in FIG. 4d. A definite and clear-cut reversal process thus takes place in all cases.

The floating aerator arrangement of the invention has further distinct advantages even in the case of a large air supply rate. In conventional floating aerators, it was possible that, in the case of an excessively large air supply rate, the aeration chain would come to a standstill by an effect similar to the effect by which a table-tennis ball is suspended on an air jet. This effect was not observed in tests with the floats arranged according to the invention even at high air supply rates.

As a result of the float arrangement according to the invention, the operation and manufacture, assembly, maintenance, and repair of aerator chains according to the invention, and thus of the total system in which these floating aerators are used, are considerably simplified. As noted above, the installation merely requires that an appropriately dimensioned, continuous hose be provided as an air supply line 3 with appropriate branch air line connections at the points to which suspended aerators are to be connected. For this purpose it is only necessary to cut holes into the air line. In this way, optimally adjusted conditions can be obtained in each case.

The floats can then be fastened to the hose lines in an extremely simple manner, i.e., by placing the two halves of the preformed sections laterally at the appropriate points and pressing them against each other in a suitable manner, so that the preformed parts interlock with each other, as is shown in the assembled condition illustrated in FIG. 2. If desired, an additional strap 8 can also be placed around the two preformed sections. For the placement of the strap, the blade 20 can be interrupted at the approximate center of the float by an appropriate recess 22, so that the strap fits tightly around the circumference, particularly in the oval part of the float. After this assembly, the projecting ends 19 of the branch air lines extend in a downward direction from the blade, so that the connecting lines 5 can be attached to them without great effort and can be secured with appropriate rapid coupling connectors or hose clamps.

After the assembly of all floats and after connection of the suspended aerators by means of the connecting lines, the system is ready for operation.

It will be understood that the floats need not consist of two preformed buoyant sections that are completely separable from each other. It is also possible, for example, to provide a continuous hinged joint in the contact region along the upper or lower edge of the two preformed sections 6 and 7, with hinged joints permitting opening up of the two sections 6 and 7 with respect to each other. Of course, a float 4 can include more than just two preformed sections. Finally, it is also pointed out that a pressure compensation opening can be provided in the preformed sections in a manner not shown in greater detail, with the opening making possible a pressure compensation in the hermetically sealed molded parts in case of temperature changes.

Although the invention has been described herein with reference to specific embodiments, many modifications and variations therein will readily occur to those skilled in the art. Accordingly, all such variations and modifications are included within the intended scope of the invention.

I claim:

1. Apparatus for aerating a body of water comprising air supply line means disposed adjacent to the surface of the water, aerator means suspended from the air supply line means below the surface of the water, float means affixed to the air supply line means and branch air line means leading from the air supply line means to the aerator means, wherein the float means comprises at least two preformed buoyant sections assembled to provide a through passage, and the air supply line means includes a continuous air line member extending through the through passage in the float means.

2. Apparatus according to claim 1 wherein the float means comprises two hollow, hermetically sealed, molded plastic sections connectable with each other.

3. Apparatus according to claim 1 wherein the preformed buoyant sections have interlocking portions.

4. Apparatus according to claim 1, wherein the preformed buoyant sections are joined by a common hinge portion extending parallel to the air supply line means.

5. Apparatus according to claim 1 wherein the float means has a metacenter located above the center of gravity with respect to the direction of immersion in the water.

6. Apparatus according to claim 1 wherein the preformed buoyant sections are formed with foamed plastic material.

7. Apparatus according to claim 1 wherein the float means includes at least one opening to receive a branch air line coupled to the air line means within the through passage.

8. Apparatus according to claim 7 wherein the opening in the float means is shaped to cooperate with the branch air line so as to transmit force applied to the branch line in a vertical downward direction to the float means.

9. Apparatus according to claim 7 including a tube connected to the aerator means and coupled to the branch air line by a hose clamp.

10. Apparatus according to claim 7 including a tube connected to the aerator means and coupled to the branch air line by a rapid coupling device.

11. Apparatus according to claim 1 wherein the float means is provided with a blade-shaped projection aligned with the air line means and extending downwardly into the body of water.

12. Apparatus according to claim 11 wherein the float means has at least one recess in the blade-like projection and including a holding member in the recess for holding the preformed buoyant sections together.

13. Apparatus according to claim 11 wherein the float means enlarges laterally in the direction upwardly from the blade-like projection into an oval cross-sectional configuration with a horizontal major axis, which is disposed at the surface of the water.

14. Apparatus according to claim 13 wherein the ratio of the portion of the float means having a suspended aerator which is located above the surface of the water to the portion of the float means located below the water is in the range of about 1:2 to about 1:5.

* * * * *